United States Patent [19]

Collado et al.

[11] 4,136,820
[45] Jan. 30, 1979

[54] AUTOMATIC CALLING DIRECTORY

[75] Inventors: Juan Collado, Bayamon; Enrique Leon, Rio Tiedras, both of P.R.

[73] Assignee: International Telephone and Telegraph Corporation, Nutley, N.J.

[21] Appl. No.: 824,373

[22] Filed: Aug. 15, 1977

[51] Int. Cl.² .......................... G06K 7/10; G08C 9/06
[52] U.S. Cl. ..................................... 235/460; 250/569
[58] Field of Search .............. 235/454, 458, 459, 460; 250/569

[56] References Cited

U.S. PATENT DOCUMENTS

| | | | |
|---|---|---|---|
| 3,036,765 | 5/1962 | Jones et al. | 235/460 |
| 3,226,690 | 12/1965 | Sharp | 235/459 |
| 3,943,337 | 3/1976 | Yamashita et al. | 235/460 |

*Primary Examiner*—Daryl W. Cook
*Attorney, Agent, or Firm*—John T. O'Halloran; Alfred C. Hill

[57] ABSTRACT

The directory includes a reader for a code punched card comprising a first portion including a first plurality of compartments having a given orientation. A single light emitting device is disposed in each of the first plurality of compartments and reflective material lines all the walls of each of the first plurality of compartments to diffuse light emitted by the light emitting device throughout the first plurality of compartments. A second portion of the automatic calling directory includes a second plurality of compartments having an orientation orthogonal to the said given orientation. A single light detecting device is diposed in each of the second plurality of compartments and reflective material lines all the walls of each of the second plurality of compartments to reflect the diffused light that pass through the punched holes in the card to the single light detecting device. Logic circuitry is coupled to each of the single light emitting devices for sequential activation thereof and is coupled to each of the single light detecting device to couple information read from the card to a transmitting line.

26 Claims, 6 Drawing Figures

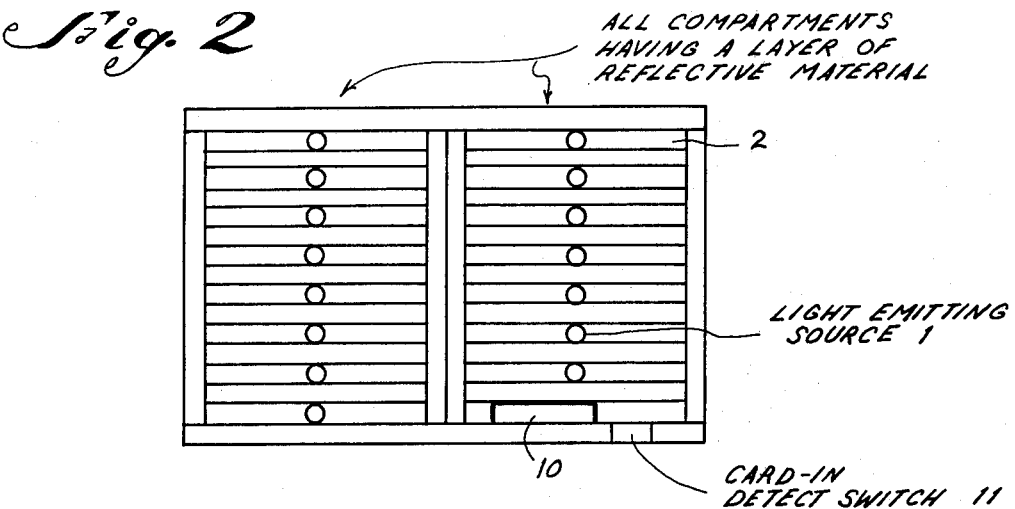
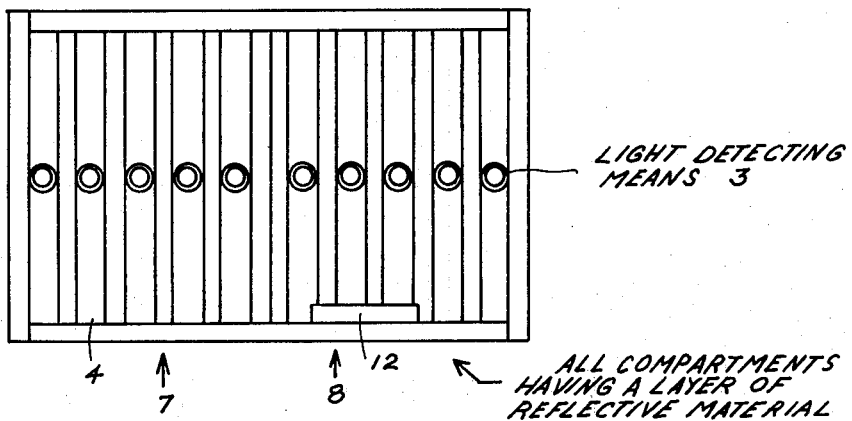
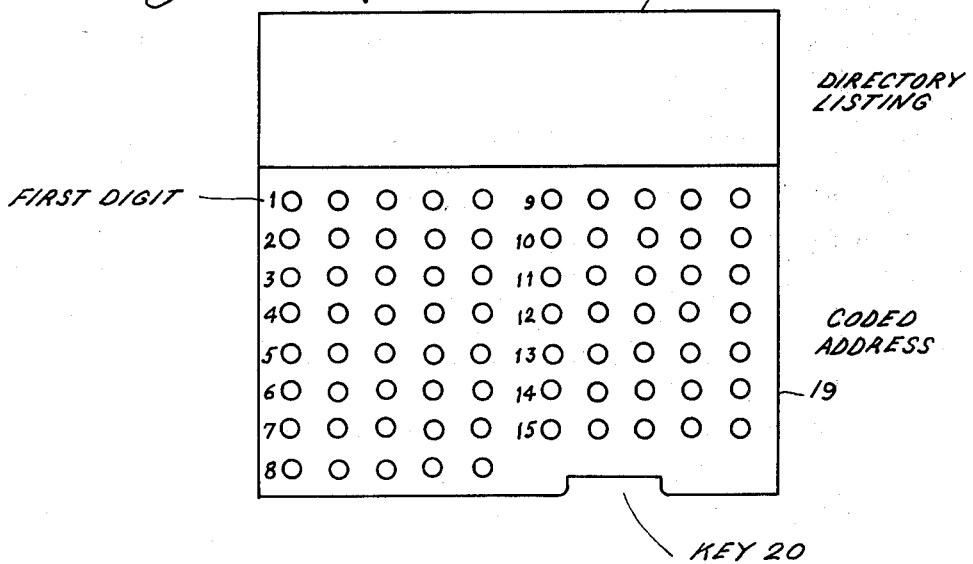

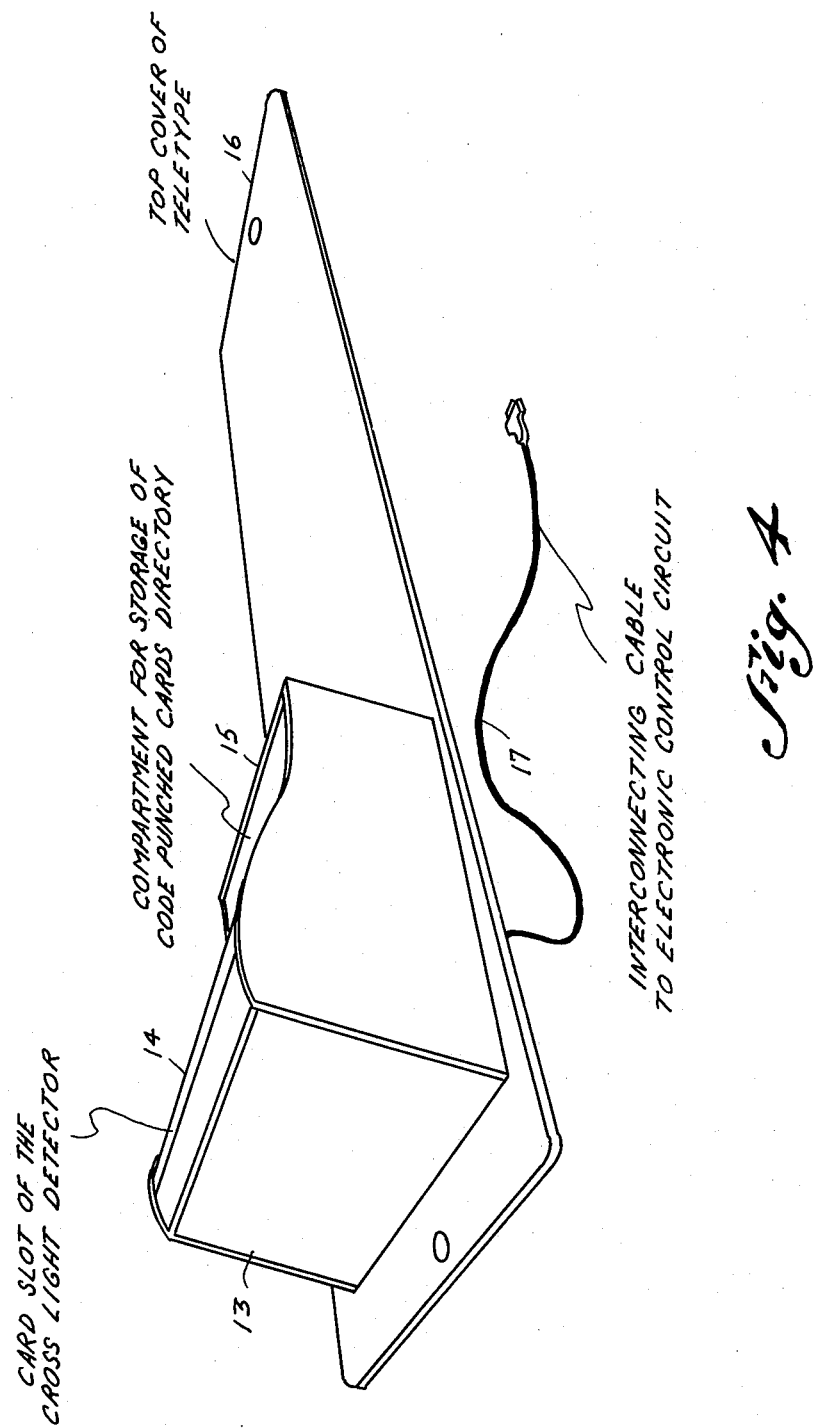

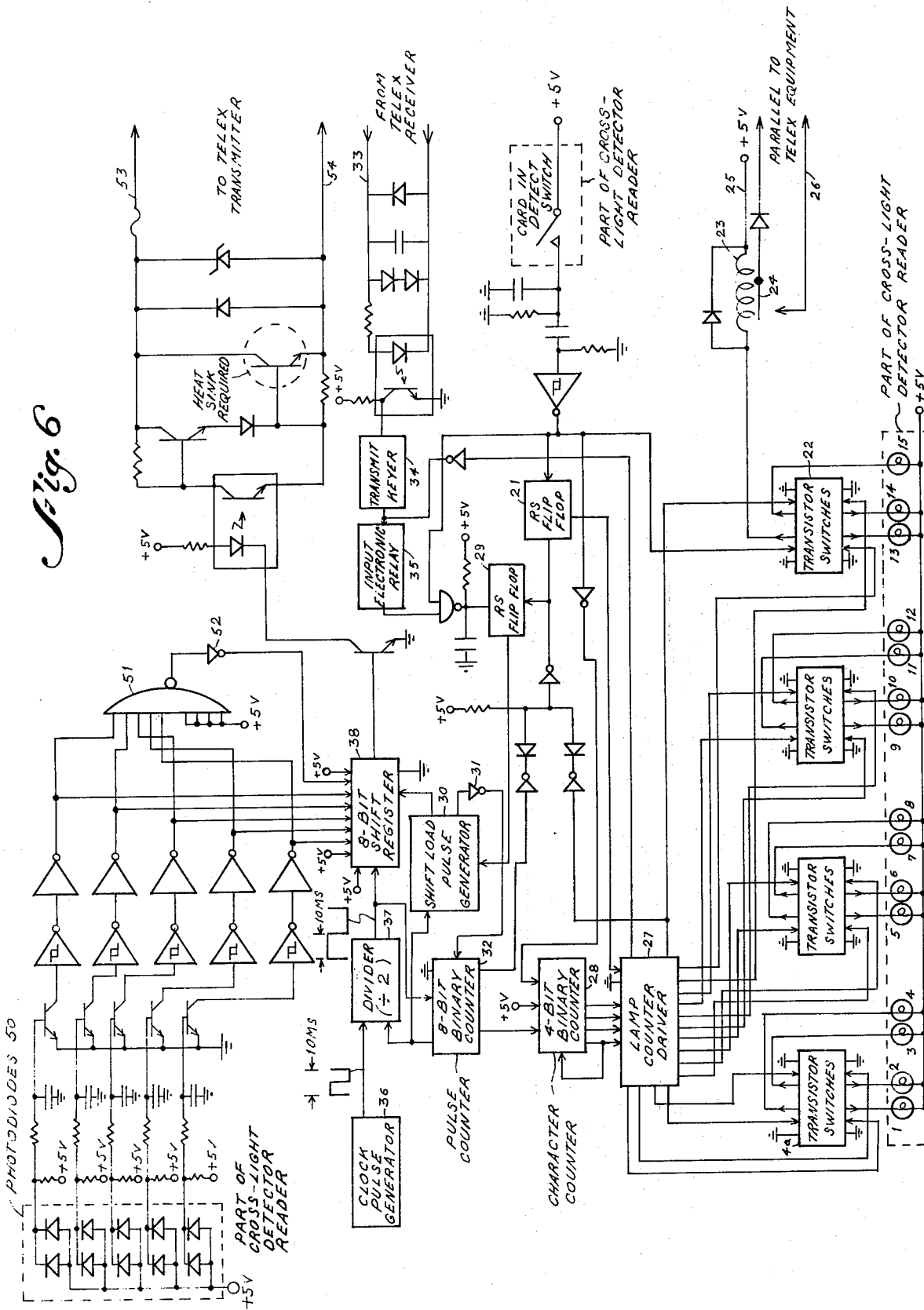

AUTOMATIC CALLING DIRECTORY

BACKGROUND OF THE INVENTION

This invention relates to readers for code punched cards and more particularly to readers employing light to read the code punched card.

There are many such code punched card readers in the prior art. For instance, one such reader would include a light emitting device and light detecting device for each of the code bit areas of the code punched card. The disadvantage of such a reader is that a large number of light emitting devices and light detecting devices are required to read the coded information on the punched card.

Another type of reader for a code punched card, as disclosed in U.S. Pat. No. 3,341,692, includes a plurality of sandwiched optically coupled paneled sections arranged in cooperative electrical relation. The sections primarily comprise a suitable light source, such as any well known electroluminescent phosphor embedded panel, an information coded element, such as a matrix or mask, a first series of parallel closely spaced transparent electrical conductors extending in the X-axis direction, a photoconductive panel, and a second series of parallel closely spaced electrical conductors extending in the Y-axis direction.

A disadvantage of this arrangement is that the light source to read the code punched card is the utilization of electroluminescent phosphor embedded panel coextensive with the code punched card emitting light from its entire surface and having no photodetectors.

SUMMARY OF THE INVENTION

An object of the present invention is to provide an improved reader for a code punched card employing light.

Another object of the present invention is to provide a reader for a code punched card that has a greatly reduced number of light emitting and light detecting devices.

Still another object of the present invention is to provide one light emitting device whose light is diffused to enable the simultaneous reading of one information character or code word.

A feature of the present invention is the provision of a reader for a code punched card comprising: a first portion including a first plurality of compartments having a given orientation, a single first means to emit light disposed in each of the first plurality of compartments, and second means lining all walls of each of the first plurality of compartments to diffuse light emitted by the single first means throughout the associated one of first plurality of compartments. The reader also comprises a second portion including a second plurality of compartments having an orientation orthogonal to the given orientation, a single third means to detect light disposed in each of the second plurality of compartments, and fourth means lining all walls of each of the second plurality of compartments to reflect the diffused light passing through the card to the single third means in all of the plurality of second compartments receiving the diffused light.

Another feature of the present invention in addition to the foregoing feature is the provision of logic circuitry coupled to each of the single first means for sequential activation thereof and coupled to each of the single second means to couple information read from the card into a transmit line.

BRIEF DESCRIPTION OF THE DRAWING

Above-mentioned and other features and objects of this invention will become more apparent by reference to the following description taken in conjunction with the accompanying drawing, in which:

FIG. 2 is a front view of the first portion of the reader in accordance with the principles of the present invention;

FIG. 3 is a front view of the second portion of the reader in accordance with the principles of the present invention;

FIG. 4 is a perspective view of the reader in accordance with the principles of the present invention in association with teletype equipment;

FIG. 5 is a view of the code punched card in accordance with the principles of the present invention; and FIG. 6 is a logic diagram of the control circuit employed with the reader in accordance with the principles of the present invention.

DESCRIPTION OF THE PREFERRED EMBODIMENT

Figure 1:
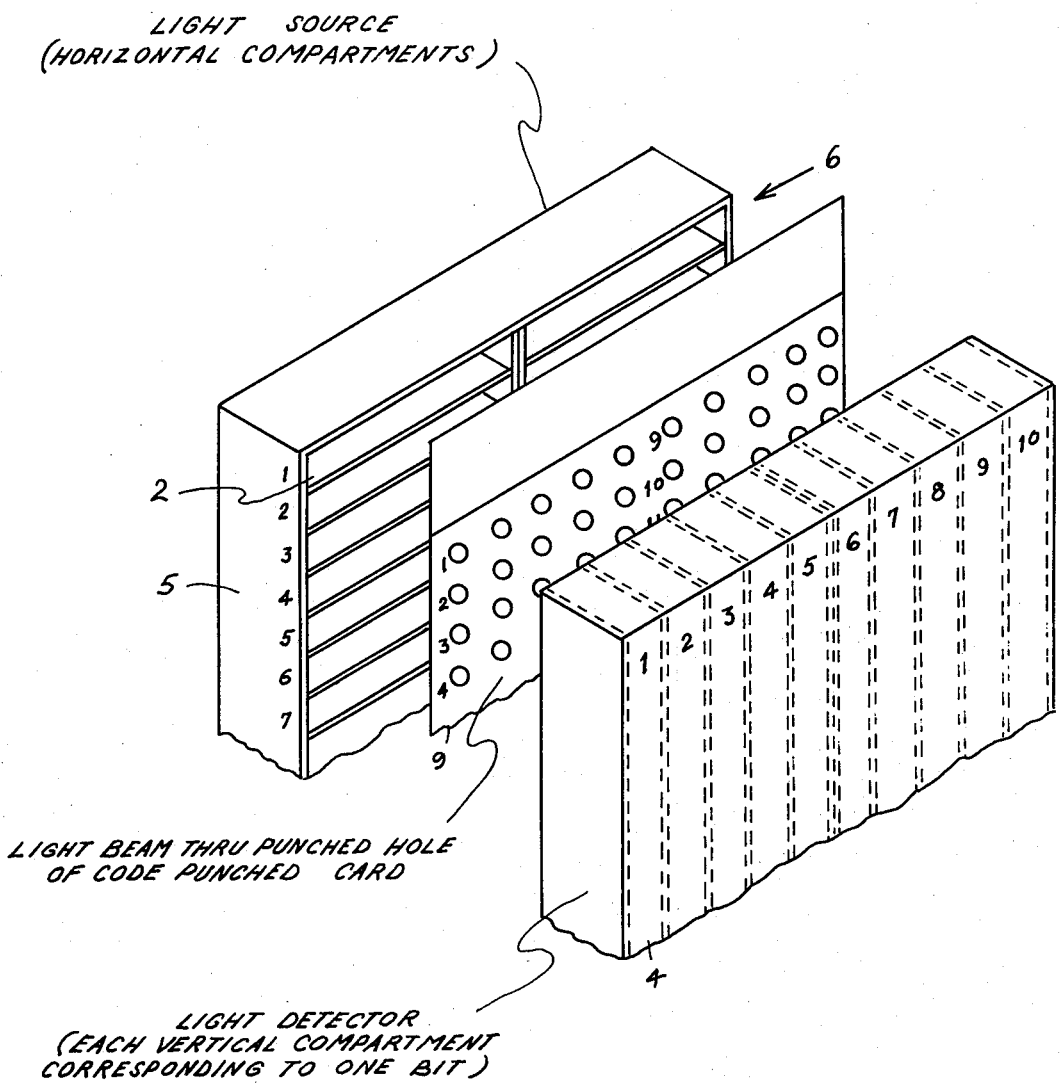
FIG. 1 is an exploded perspective view of a portion of the reader in accordance with the principles of the present invention showing the code punched card in its reading relationship with the two portions of the reader.

The description that follows is directed toward the use of the reader with a telex teletypewriter terminal. However, it should be understood that the same reader could be used with other security and communication systems, such as a telephone system where the reader and the card replaces the dial or push buttons of a telephone subset.

The automatic calling directory or reader is employed for automatic generation of telex calls. The process for automatic generation of telex calls by means of the reader consists of the following basic sequence:

(A) The calling telex customer selects the directory card of the desired correspondent and inserts it in the corresponding card slot of the reader.

(B) Upon full insertion of the code punched card, a card-in detect-switch is activated.

(C) The activation of the card-in detect-switch, signals the call request to the control circuits of the reader, which in turn extends the calling signal to the telex exchange via the telex line.

(D) Upon recognition of the bid for service by the local telex exchange, the latter receives a call confirmation signal, i.e. positive voltage (mark) on the telex receiver line and thereafter sends proceed-to-select-signal in telegraphic code.

(E) Upon detection of receipt of the proceed-to-select-signals at the reader, the inserted program card will be read and the corresponding selection information or address digits will be keyed onto the telex line, i.e. 14 maximum address digits and the end of address sign plus (upper case Z).

(F) Upon recognition of the end of address signal sign plus the upper case Z the reader will disable itself until the telex line has gone idle (space) for at least one second and the punch code card has been removed and re-inserted. (Card-in detect switch deactivated and re-activated.)

The automatic calling directory is composed of three basic sections: (1) a cross-light detector or reader; (2) a control circuit for the detector; and (3) a coded punched card.

Referring to FIGS. 1, 2 and 3, the cross-light detector is a light sensitive reader which can be used to detect "X" (horizontal) time and "Y" (vertical) numbers of functions. Structurally the cross-light detector consists of an X/Y matrix composed of light emitting sources (readers) on one side and of light sensitive photodiodes (detectors) on the other side of the code punched card. One light emitting source 1 is mounted inside a horizontal light reflecting compartment 2, while the light detecting means 3 are mounted in vertical light reflecting compartments 4. The light emitting source may be a semiconductor light emitting diode and the light detectors may be semiconductor photodiodes or semiconductor phototransistors.

The compartments, both the horizontal and vertical compartments, are made reflective by means of lining all walls of the compartments by a light reflective material, such as aluminum foil, paint or the like. The light reflecting compartments are individually isolated with the intentions of preventing interference with adjacent compartments. The sensitivity of the light detector is, therefore, determined by the amount of driving light that the light emitting sources can project at any given time.

The light sources and light detectors are frontally matched in a compartment sectioned box so that each one of the photodetectors remains under the exclusive control of the corresponding light emitting source.

The light emitting sources are normally disabled in the idle state of the automatic calling directory and they remain in the off condition until a code punched card is newly inserted in an idling terminal. The cross-light detector and the corresponding control circuits are designed for a maximum capacity of 15 digits.

The physical layout and construction of the cross-light detector, as used in the automatic calling directory, includes light emitting sources mounted inside of fifteen horizontal compartments, each divided into two rows 5 and 6. One light emitting source is installed at the center of each compartment. All of the walls of the compartments 2 are covered or lined with aluminum foil, in order to increase, by means of reflection, the light generator capacity of the light emitting sources and to diffuse the light emitted from the light emitting sources throughout the entire compartments. One light detecting means is mounted inside each of ten vertical compartments 4 divided into two sections 7 and 8 of five compartments each.

Light detecting means are mounted in the center of each vertical compartment 4 and all of the walls of the vertical compartments 4 are covered with a reflective material, such as aluminum foil, to increase by means of reflection, the sensitivity of the diffused light passing through code punched card 9. This enables the simultaneous reading of a five digit teletype character or a five digit code word from one light source. The same five light detectors are used to read eight code words. Thus, the saving in the number of light emitters and light detectors over the prior art where there is a one to one relationship of one light emitter and one light detector per digit area of the card is very obvious.

With respect to the horizontal compartments 2, light from the light emitting source therein is diffused throughout the compartment 2 so that one source of light can pass through apertures if they are present in card 9 to the five vertical compartments 4 so that the single light detecting means therein may decode one row of the card associated therewith. It should be noted that card 9, although shown in FIG. 1 as including all punched holes, that according to the code provided on the card 9 certain of these holes will be eliminated so that the hole is closed and a binary "0" can be inserted into the address carried by card 9.

When the diffused light from compartments 2 pass through a punched hole in a five digit binary word, the five vertical columns 4 associated with this five bit word will simultaneously detect by one light detecting means in each compartment the code present in the code word adjacent the compartment 2 whose light emitting source has been turned on.

As illustrated in FIG. 2, the sixteenth horizontal compartment 2 does not have a light emitting source therein but rather includes a projection 10 to provide an index for the code punched card. Adjacent projection 10 a card-in detect switch 11 is provided to activate the control circuit associated with the cross-light detector which will be more fully described with respect to FIG. 6. As illustrated in FIG. 3, there is a slot 12 to cooperatively receive projection 10 of the light source portion. Slot 12 is needed for cooperation with projection 10 so that the light source portion and the light detector portion can be in close proximity to each other to just enable a card to be inserted in the cross-light detector of the automatic calling directory.

Referring to FIG. 4 there is illustrated therein the manner in which the automatic calling directory reader can be mounted on teletype equipment. In the instance shown, the cross-light detector 13 having a card slot 14 and a compartment 15 for storage of code punched cards are mounted upon the top cover 16 of the teletype equipment adjacent the operator. From cross-light detector 13 there is provided an interconnecting cable 17 which is coupled to the control circuit for the cross-light detector 13 to be discussed hereinbelow with respect to FIG. 6.

Referring to FIG. 5, there is illustrated therein a code punched card employed with the reader of the present invention. This card may be made of plastic or a stiff cardboard material. The purpose of the code punched card is to permanently record the address digits of the desired telex correspondents by means of punched holes and blank areas to provide binary "1" when light passes through the holes and binary "0" when light does not pass through a digit position. The programming of the address digits is done on a five level Baudot code whereby a punched hole corresponding to a "mark" condition (stop polarity). A maximum of fifteen digits can be recorded on the code punched card. The start signal and the stop signal are not included in the code punched card, since they are automatically generated by the control circuits of the automatic calling directory.

The code punched card is divided into three basic sections. The first section is a directory listing section 18. This section of upper section of the card is intended for displaying the numeric figures of the digits programmed into the card and if desired the called correspondent answer back. The second section includes the program or code address section 19. This section of the card is used to permanently record, by means of punched holes and blank digit areas, the numerical digits of the telex number of the desired telex correspondent. A maximum of 15 five digit addresses can be recorded on the card. The address information digits are recorded in sequential order. For addresses with less than 15 digits, the portion of the areas not being used is left blank. The third section of the code punched card is the key 20. Key 20 engages projection 10 (FIG. 2) of the light source portion and is used to control the correct insertion of the code punched card and the subsequent activation of the card-in detect switch 11 as shown in FIG. 2 and in the control circuit of FIG. 6, whereby a backward insertion will be prevented from initiating a calling cycle.

Referring to FIG. 6, there is illustrated therein the control circuit necessary to operate the cross-light detector described hereinabove. This control circuit of FIG. 6 is provided with electronic logic circuitry required for operation of the automatic calling directory. For reasons of convenience the control circuit section of the automatic calling directory is mounted on a separate chassis and is, preferably, installed in the free space of the teletypewriter stand.

The control circuit is activated by the closing of the card-in detect switch 11, which in turn represents the call service initial request made by the operator of the telex terminal.

The insertion of a code punched card into the reader and the subsequent activation of the card-in detect switch presets the RS flip flop 21 and presents a call condition to the telex switching exchange through one of the transistor switches of transistor switches 22, relay 23, contact 24 and the lines 25 and 26 to the telex equipment. Flip flop 21 clears and enables lamp counter driver 27. When switch 11 is closed the binary counter 28 through inverter 29 is enabled. Flip flop 21 through flip flop 29 and shift load pulse generator 30 enables counter 32. This leaves generator 30 ready to be triggered. Generator 30 is a dual retriggerable monostable multivibrator with clear which may be obtainable from Texas Instruments, Inc. and is identified by Model #SN 74123.

With the calling condition presented and upon reception of a change of polarity on the telex line 33 the transmit keyer 34 and input electronic relay 35 are activated. After detection of "end of register" generator 30 is activated and the bit counter 32 is cleared.

The clearing of bit counter 32 will enable clock pulse generator 36 and divider 37. Counter 32 will count eight pulses which drives the shift register 38. When the bit counter reaches the count of two, the lamp counter 27 counts ones, turning on lamp #1 through one transistor switch of transistor switches 49. This function is called "turn one condition."

As soon as lamp #1 is turned on, it's diffused light will activate those of the photodiodes 50 corresponding to the bits programmed on the inserted card. The logic conditions will be presented to shift register 38 with another input received by shift register 38 from NAND gate 51 through inverter 52. This will continue until a shift load pulse is generated by the triggering of the count eight of counter 32.

When counter 32 reaches the count of eight, it triggers generator 30 which in turn clears counter 32 through NAND gate 31. This action enables the clock pulse from generator 36 to pass through divider 37 which pushes the serial information already loaded in the shift register 38 to the telex transmitter lines 53 and 54. When the bit register 32 reaches the count of two, lamp #2 is turned on and the sequence described for "turn one condition" is repeated until the lamp counter driver 27 reaches a count of 15.

Characters not programmed on the card will not generate output characters and a steady "mark" condition will be maintained on the lines 53 and 54. Therefore, the end of the address signal is programmed immediately after the last valid character on the card. When counter 27 reaches count 15, the RS flip flop 21, preset at the insertion of the card is reset and the control unit is deactivated until the next card is inserted into the card reader.

While we have described above the principles of our invention in connection with specific apparatus it is to be clearly understood that this description is made only by way of example and not as a limitation to the scope of our invention as set forth in the objects thereof and in the accompanying claims.

We claim:
1. A reader for a code punched card comprising:
 a first portion including
  a first plurality of compartments having a given orientation,
  a single first means to emit light disposed in each of said first plurality of compartments, and
  second means completely lining all walls of each of said first plurality of compartments to diffuse light emitted by said single first means throughout an associated one of said first plurality of compartments; and
 a second portion including
  a second plurality of compartments having an orientation orthogonal to said given orientation,
  a single third means to detect light disposed in each of said second plurality of compartments, and
  fourth means completely lining all walls of each of said second plurality of compartments to reflect said diffused light passing through said card to said single third means in all of said plurality of second compartments receiving said diffused light.
2. A reader according to claim 1, wherein said given orientation is horizontal.
3. A reader according to claim 2, wherein said single first means includes a lamp.
4. A reader according to claim 2, wherein said single first means includes a semiconductor light emitting means.
5. A reader according to claim 4, wherein said semiconductor light emitting means includes a light emitting diode.
6. A reader according to claim 2, wherein said second means includes a reflective material.
7. A reader according to claim 6, wherein said reflective material includes aluminum foil.
8. A reader according to claim 2, wherein said single third means includes a semiconductor light detection means.
9. A reader according to claim 8, wherein said semiconductor light detection means includes a photodiode.
10. A reader according to claim 8, wherein said semiconductor light detection means includes a phototransistor.
11. A reader according to claim 2, wherein said fourth means includes a reflective material.
12. A reader according to claim 11, wherein said reflecting material includes aluminum foil.
13. A reader according to claim 2, further including logic circuitry coupled to each of said single first means for sequential activation thereof and to each of said single third means to couple information read from said card to a transmit line.

14. A reader according to claim 13, further including a projection at the bottom of one of said first and second portions;
a notch in the bottom of said card to engage said projection to properly orient said card in said reader; and
a switch coupled to said logic circuitry, said switch being disposed adjacent said projection and activated by said card when said card is properly oriented and fully inserted in said reader to actuate said logic circuitry.

15. A reader according to claim 1, wherein said single first means includes a lamp.

16. A reader according to claim 1, wherein said single first means includes a semiconductor light emitting means.

17. A reader according to claim 16, wherein said semiconductor light emitting means includes a light emitting diode.

18. A reader according to claim 1, wherein said second means includes a reflective material.

19. A reader according to claim 18, wherein said reflective material includes aluminum foil.

20. A reader according to claim 1, wherein said single third means includes a semiconductor light detection means.

21. A reader according to claim 20, wherein said semiconductor light detection means includes a photodiode.

22. A reader according to claim 20, wherein said semiconductor light detection means includes a phototransistor.

23. A reader according to claim 1, wherein said fourth means includes a reflective material.

24. A reader according to claim 23, wherein said reflecting material includes aluminum foil.

25. A reader according to claim 1, further including logic circuitry coupled to each of said single first means for sequential activation thereof and to each of said single third means to couple information read from said card to a transmit line.

26. A reader according to claim 25, further including a projection at the bottom of one of said first and second portions;
a notch in the bottom of said card to engage said projection to properly orient said card in said reader; and
a switch coupled to said logic circuitry, said switch being disposed adjacent said projection and activated by said card when said card is properly oriented and fully inserted in said reader to actuate said logic circuitry.

* * * * *